July 16, 1957  J. W. KOVACH  2,799,750
THERMOSTAT
Filed Nov. 22, 1955  2 Sheets-Sheet 1
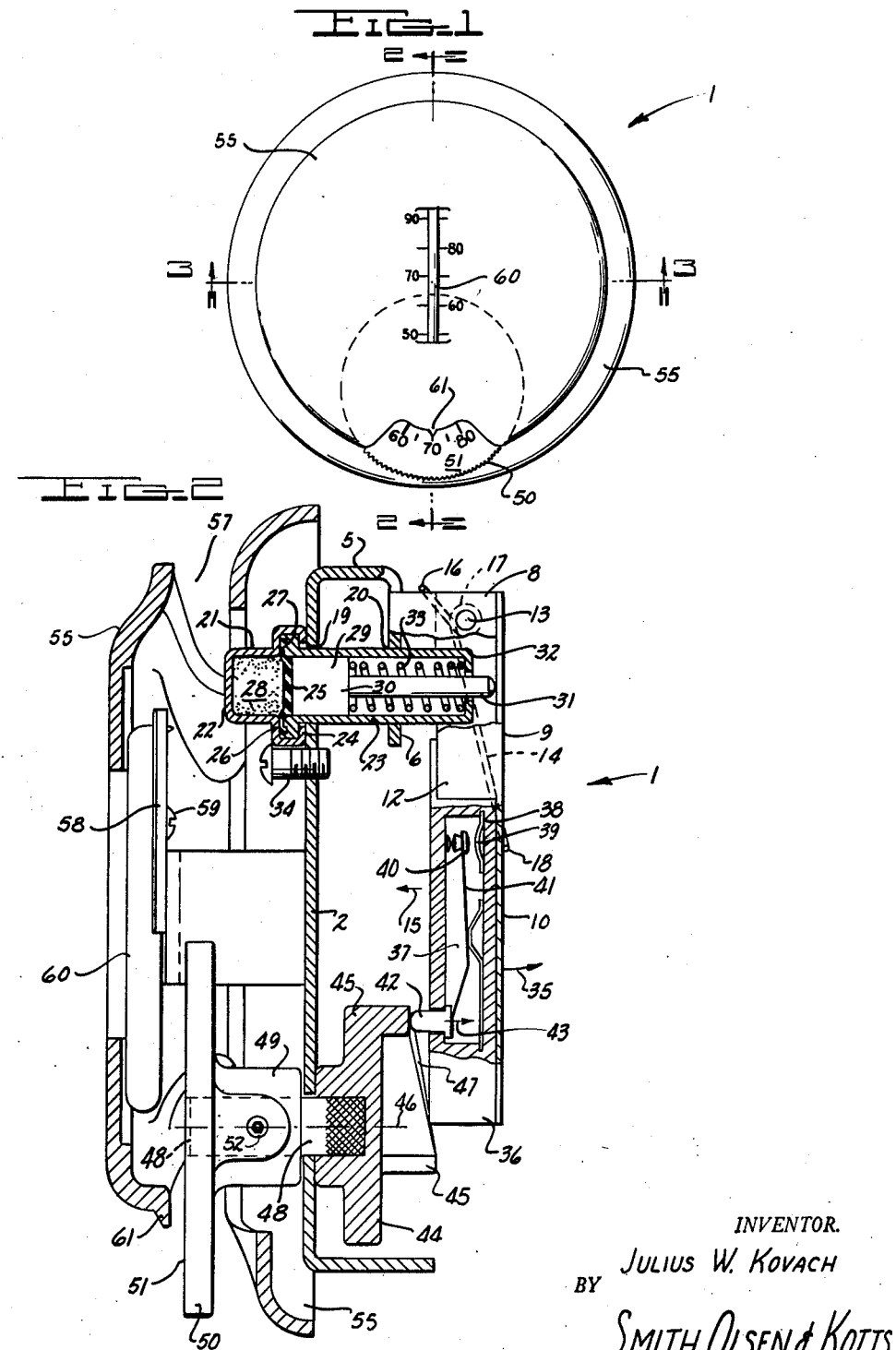
INVENTOR.
JULIUS W. KOVACH
BY
SMITH, OLSEN & KOTTS
ATTORNEYS July 16, 1957
J. W. KOVACH
2,799,750
THERMOSTAT
Filed Nov. 22, 1955
2 Sheets-Sheet 2
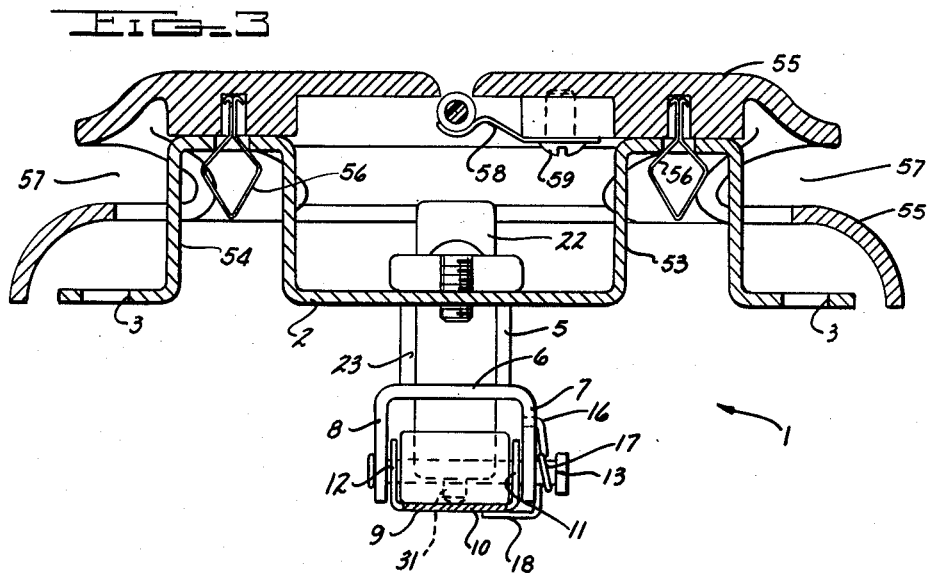
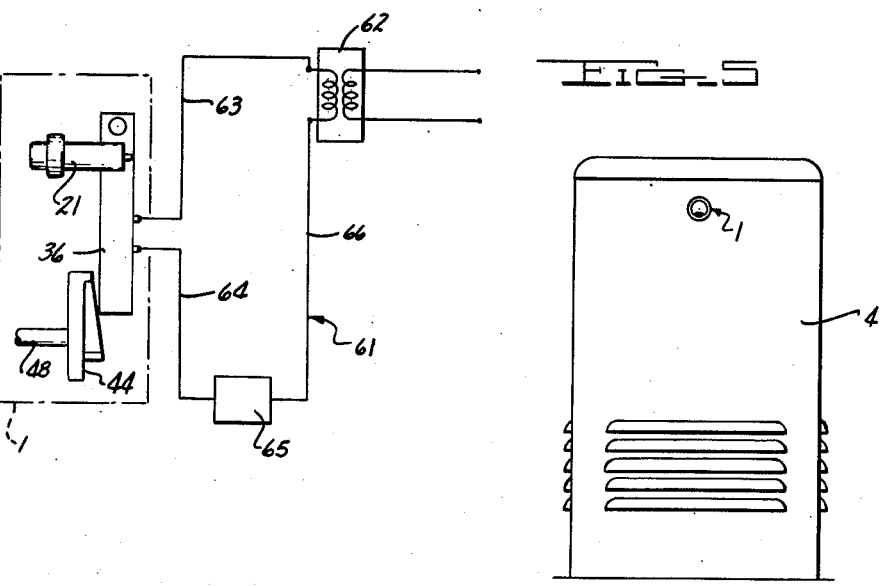
INVENTOR.
JULIUS W. KOVACH
BY
SMITH, OLSEN & KOTTS
ATTORNEYS

United States Patent Office 2,799,750
Patented July 16, 1957

2,799,750

THERMOSTAT

Julius William Kovach, Detroit, Mich., assignor to Detroit Controls Corporation, Detroit, Mich., a corporation of Michigan Application November 22, 1955, Serial No. 548,436

12 Claims. (Cl. 200—140)

This invention relates to a thermostat for controlling the operation of a room heater.

Operation of a thermostat is such that when the room temperature falls below a desired predetermined value a temperature responsive mechanism in the thermostat causes an electrical circuit through the thermostat to be closed so as to put the room heater into operation. When the room heater has warmed the room above the predetermined value the temperature responsive mechanism opens the electrical circuit through the thermostat so as to shut off the room heater. The "predetermined temperature" may be manually varied in accordance with the desires of the room occupants.

The room thermostat should:

1. Act as quickly as possible in response to room temperature changes so as to decrease fluctuations in room temperature,
2. Actuate the switch in response to a very small room temperature change so as to put the room heater into operation as quickly as possible after the need for heat,
3. Include a temperature responsive mechanism in which very little movement is required to actuate the switch,
4. Include a switch which operates with a "snap" action so as to instantly respond to the condition of the temperature responsive mechanism, and
5. Be a low cost item.

Objects of the present invention are to provide a thermostat having the above-identified characteristics.

Other objects of this invention will appear in the following description and appended claims, reference being had to the accompanying drawings forming a part of this specification wherein like reference characters designate corresponding parts in the several views.

In the drawings:

Fig. 1 is a front elevation view of a thermostat constructed according to the invention, Fig. 2 is a sectional view taken on line 2—2 in Fig. 1, Fig. 3 is a sectional view taken on line 3—3 in Fig. 1, Fig. 4 is a schematic view of an electrical circuit in which the Fig. 1 thermostat may be employed, and Fig. 5 is an elevational view of a space heater with the Fig. 1 thermostat installed thereon.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a thermostat 1 including a support means in the form of a vertical plate 2. Plate 2 is provided with a plurality of openings 3 for receiving screws or other fastening means (not shown) with which to mount the thermostat on a space heater 4 or wall of the room being heated thereby.

Plate 2 has a horizontal flange 5 extended rearwardly from its upper edge. Flange 5 terminates in a downwardly extending vertical flange 6, and two vertical ears 7 and 8 are extended rearwardly from the lateral edges of flange 6. A bracket 9 is positioned between ears 7 and 8. Bracket 9 includes a wall portion 10 and two ear portions 11 and 12. A pivot pin 13 extends through ears 7, 8, 11 and 12, and a spring 14 is positioned in pressure engagement with wall portion 10 so as to urge bracket 9 in the direction of arrow 15. Spring 14 includes a portion 16 hooked over ear 7, a portion 17 turned around pin 13, and a portion 18 hooked over wall portion 10.

Plate 2 and flange 6 are provided with horizontally aligned openings 19 and 20 for the mounting of a temperature responsive power means 21. A screw 34 cooperates with openings 19 and 20 to retain power means 21 in its illustrated position. Power means 21 includes a container 32 formed by a cup 22 and sleeve 23. Cup 22 is provided with a peripheral flange 24 which serves to clamp a flexible diaphragm 25 between shoulders 26 and 27 formed on cup 22 and sleeve 23, respectively. Within cup 22 there is disposed a body or pellet of expansible-contractible temperature responsive material 28 which may be a mixture of one or more waxes, a binder, and finely divided heat conducting material such as copper. Within sleeve 23 there is disposed a piston 29 which includes a relatively large diameter slide portion 30 and a relatively small diameter rod portion 31 projecting through an opening in sleeve 23. The projecting portion 31 may be considered as a movable wall of container 32. A comparatively light compression spring 33 urges piston 29 into pressure engagement with diaphragm 25 against the expansive action of body 28. The right end of rod portion 31 abuts against wall portion 10, and on a temperature increase in the room being heated body 28 expands so as to move piston to the right. This movement of piston 29 is translated into a pivotal movement of bracket 9 around pin 13 in the direction of arrow 35.

Secured on wall portion 10 is a switch housing 36, and disposed within this housing is a switch means 37. Switch means 37 includes a terminal plate 38, contacts 39 and 40, a fragmentarily shown switch blade 41, and a switch actuator 42. Movement of actuator 42 relative to housing 36 in the direction of arrow 43 causes blade 41 to flex so as to snap contact 40 into engagement with contact 39. Blade 41 includes a terminal portion (not shown), and when contacts 39 and 40 are engaged current may flow through terminal plate 38, contacts 39 and 40, blade 41 and the blade terminal portion.

In registry with actuator 42 is an actuator operating mechanism 44. Mechanism 44 includes a member 45 mounted for rotatable movement around axis 46. Member 45 includes a surface 47 which extends in axial registry with the direction of member 45 movement and at an acute angle to the direction of actuator 42 movement (indicated by arrow 43). The term "axial" refers to a line along axis 46 and all lines parallel thereto.

Fixedly secured on member 45 is a shaft 48 which extends through an opening in plate 2 and into a hub 49. Hub 49 is integrally formed on a wheel or knob 50 which is provided on its front face 51 with temperature setting indicia (see Fig. 1). A set screw 52 extends radially through hub 49 to releasably secure the hub in any rotated position on shaft 48. The rotated position of the hub is determined by the temperature response characteristics of power means 21. With hub 49 in an adjusted position knob 50 can be turned around axis 46 to put different portions of surface 47 in registry with actuator 42. The rotated position of member 45 determines the temperature at which switch 37 is actuated.

Plate 2 is provided with forwardly offset portions 53 and 54 (see Fig. 3), and a cover plate 55 is positioned over the front face of plate 2. Clips 56 extend rearwardly from plate 55 through openings in portions 53 and 54 so as to releasably secure plate 55 on plate 2. Openings 57 are provided in plate 55 to allow room air to circulate around cup 22. A room temperature thermometer 60 is mounted on plate 55 by means of a bracket 58 and screw 59.

Operation of thermostat 1 is such that the room occupant can select the room temperature by turning knob 50 until the desired temperature value on face 51 registers with pointer 61 formed integrally with cover plate 55. The thermostat is so calibrated (by means of set screw 52) that when the room temperature is just above the thermostat temperature setting actuator 42 is in its illustrated position relative to housing 36, and the "expansive-contractive" condition of body 28 is such as to allow actuator 42 to contact surface 47.

If the room temperature should fall below the desired temperature value on face 51 body 28 would contract so as to allow spring 14 to move switch housing 36 in the direction of arrow 15. Actuator 42 would thereby be pressed against surface 47 and blade 41 would flex sufficiently to snap contact 40 into engagement with contact 39. The snap action of blade 41 requires very little movement of actuator 42 to make and break the contact between elements 39 and 40. Additionally the relative distance between rod portion 31 and pin 13 as opposed to that between actuator 42 and pin 13 insures that only a very small movement of rod portion 31 is required to operate actuator 42. In the illustrated construction the movement of actuator 42 is approximately six times that of rod portion 31. As a result of these two factors a very small temperature change is sufficient to change the volume of body 28 to the extent necessary to operate actuator 42.

Operation of actuator 42 such as to close contacts 39 and 40 allows current flow through an electrical circuit 61. Circuit 61 includes a source of low voltage current in the form of a transformer 62, a line 63, switch 37, line 64, the control circuit for an oil burner or other heat source 65, and line 66.

When the room temperature is raised above the desired temperature value on face 51 body 28 expands sufficiently to move rod 29 to the right so as to move housing 36 in the direction of arrow 35 relative to actuator 42. The springiness of blade 41 maintains actuator 42 in engagement with surface 47, and contact 40 snaps back to its illustrated position so as to interrupt current flow through circuit 61 and put heat source 65 out of operation.

When it is desired to change the room temperature knob 50 is turned so as to put a different portion of surface 47 in registry with actuator 42. In order to increase the temperature setting knob 50 is turned so as to put the "actuator registering" portion of surface 47 to the right of that illustrated in Fig. 2. To decrease the temperature setting knob 50 is turned so as to put the "actuator registering" portion of surface 47 to the left of that illustrated in Fig. 2.

In some instances it is necessary to employ a small heater (not shown) to increase the time response characteristics of power means 21. Such a heater is connected in series with switch 37 and preferably takes the form of a small light bulb thermistor or length of resistance wire. The heater is located adjacent cup 22, and knob 50 is so adjusted on shaft 48 (by set screw 52) that on decrease in the room temperature body 28 causes actuator 42 to operate before the temperature of body 28 falls to the temperature setting on face 51. As soon as switch contacts 39 and 40 are closed by actuator 42 the heater tends to raise the temperature of body 28. If the room temperature is sufficiently low the heater is ineffective to open contacts 39 and 40, due to the "body 28 contraction" effect of the room atmosphere. If the room temperature is sufficiently high the heater is effective to open contacts 39 and 40. There is a certain hysteresis lag in body 28, and the heater cooperates with the screw 52 adjustment to correct for this lag by starting switch actuating movement of body 28 before the room temperature drops to the temperature indicated on face 51.

I claim:

1. A thermostat comprising a support plate; at least one ear projecting from said plate; a bracket alongside said ear; temperature responsive power means between the plate and bracket; pivot means between said ear and bracket; spring means hooked over said ear, around said pivot means, and into pressure engagement with said bracket; switch housing means secured on said bracket; a movable switch actuator projecting from said housing means; actuator operating mechanism movably mounted on said support plate and having a surface in registry with said actuator; said surface extending in registry with the direction of mechanism movement and at an acute angle to the direction of actuator movement; and manually actuable means for moving the actuator operating mechanism in accordance with the desired switch-actuating temperature.

2. A thermostat comprising a support plate; at least one ear projecting from said plate; a bracket alongside said ear; temperature responsive power means between the plate and bracket; pivot means between said ear and bracket; spring means hooked over said ear, around said pivot means, and into pressure engagement with said bracket; switch housing means secured on said bracket; a movable switch actuator projecting from said housing means; actuator operating mechanism rotatably mounted on said support plate and having a surface in registry with said actuator; said surface extending in registry with the direction of mechanism movement and at an acute angle to the direction of actuator movement; and manually actuable means for moving the actuator operating mechanism in accordance with the desired switch-actuating temperature.

3. A thermostat comprising a support plate; at least one ear projecting from said plate; a bracket alongside said ear; temperature responsive power means between the plate and bracket; said power means including a container having a movable wall, and a body of thermally expansible material within said container; pivot means between said ear and bracket; spring means hooked over said ear, around said pivot means, and into pressure engagement with said bracket; switch housing means secured on said bracket; a movable switch actuator projecting from said housing means; actuator operating mechanism movably mounted on said support plate and having a surface in registry with said actuator; said surface extending in registry with the direction of mechanism movement and at an acute angle to the direction of actuator movement; and manually actuable means for moving the actuator operating mechanism in accordance with the desired switch-actuating temperature.

4. A thermostat comprising a support plate; at least one ear projecting from said plate; a bracket alongside said ear; temperature responsive power means between the plate and bracket; pivot means between said ear and bracket; resilient means urging said bracket toward said plate; switch housing means secured on said bracket; a movable switch actuator projecting from said housing means; actuator operating mechanism movably mounted on said support plate and having a surface in registry with said actuator; said surface extending in registry with the direction of mechanism movement and at an acute angle to the direction of actuator movement; and manually actuable means for moving the actuator operating mechanism in accordance with the desired switch-actuating temperature.

5. A thermostat comprising a support plate; at least one ear projecting from said plate; a bracket alongside said ear; temperature responsive power means between the plate and bracket; said power means including a container having a movable wall, and a body of thermally expansible material within said container; pivot means between said ear and bracket; resilient means urging said bracket toward said plate; switch housing means secured on said bracket; a movable switch actuator projecting from said housing means; actuator operating mechanism movably mounted on said support plate and having a surface in registry with said actuator; said surface extending in registry with the direction of mechanism movement and at an acute angle to the direction of actuator movement; and manually actuable means for moving the actuator operating mechanism in accordance with the desired switch-actuating temperature.

6. A thermostat comprising a vertical plate having a horizontal flange extended from its upper edge and terminating in a downwardly extending vertical flange; at least one vertical ear extended from said vertical flange away from said plate; a bracket alongside said ear; pivot means between said ear and bracket; horizontally aligned openings in said plate and vertical flange; a container extended through said openings and having a movable wall engaged with said bracket; a body of thermally expansible material within said container; resilient means urging said bracket toward said plate; switch means mounted on said bracket and having a movable actuator; and actuator operating mechanism in registry with said actuator.

7. A thermostat comprising a plate; a bracket; means extending from the plate and pivotally mounting the bracket; resilient means urging the bracket toward the plate; switch means mounted on said bracket and having a movable actuator; temperature responsive power means extending between the plate and bracket at a point between the bracket pivot and switch means; and actuator operating mechanism in registry with said actuator for moving the bracket and switch means relative to the plate so as to vary the switch-actuation temperature.

8. A thermostat comprising support means; switch housing means pivotally mounted on said support means; temperature responsive power means between the support means and switch housing means; said power means engaging said housing means at a point between the pivot and actuator; a movable switch actuator projecting from said housing means; actuator-operating mechanism movably mounted on said support means and having a surface in registry with said actuator; said surface extending in registry with the direction of mechanism movement and at an acute angle to the direction of actuator movement; resilient means urging said switch housing means toward said support means; and manually actuable means for moving the actuator-operating mechanism in accordance with the desired switch-actuating temperature.

9. A thermostat comprising support means; an elongated bracket pivotally mounted at one of its ends on said support means; a switch carried by the other end of said bracket; temperature responsive power means between the support means and an intermediate point of the bracket; a movable switch actuator projecting from said switch; actuator-operating mechanism rotatably mounted on said support means and having a surface in registry with said actuator; said surface extending in registry with the direction of mechanism movement and at an acute angle to the direction of actuator movement; resilient means urging said switch housing means toward said support means; and manually actuable means for rotating the actuator-operating mechanism in accordance with the desired switch-actuating temperature.

10. A thermostat comprising a support plate; wall-attachment openings formed in said plate; switch means pivotally mounted on the rear face of said support plate; resilient means urging the switch means toward the support plate; temperature-responsive power means mounted on said plate for operating the switch means; said power means including a temperature-sensitive portion on the front face of said support plate aand a movable wall extending into operative engagement with the switch means; means movably mounted on said support plate for varying the switch-actuation temperature; said varying means including a manually rotatable knob located on the front face of the support plate; a cover plate releasably carried on the front face of said support plate and partially overlying said knob; said cover plate having peripheral portions turned rearwardly so as to terminate in the plane of the support plate; openings in said cover plate for allowing air to circulate around the temperature-sensitive portion of the power means; and spacer means between the support plate and cover plate for positioning the central portion of the cover plate away from the power means.

11. A thermostat comprising a support plate; wall-attachment openings formed in said plate; switch means pivotally mounted on the rear face of said support plate; resilient means urging the switch means toward the support plate; temperature-responsive power means mounted on said plate for operating the switch means; said power means including a temperature-sensitive portion on the front face of said support plate and a movable wall extending into operative engagement with the switch means; means movably mounted on said support plate for varying the switch-actuation temperature; said varying means including a manually rotatable knob located on the front face of the support plate; a cover plate releasably carried on the front face of said support plate and partially overlying said knob; said cover plate having peripheral portions turned rearwardly so as to terminate in the plane of the support plate; openings in said cover plate for allowing air to circulate around the temperature-sensitive portion of the power means; said support plate having two forwardly offset portions extending beyond the forward end of the power means; apertures in said offset portions; and clips extending from said cover plate through said apertures for releasable securement of the cover plate on the support plate.

12. The combination of claim 11 and further comprising a slot in said cover plate, and temperature-indicating means carried on said cover plate directly behind said slot so as to be visible from in front of the thermostat.

References Cited in the file of this patent

UNITED STATES PATENTS

| | | |
|---|---|---|
| 2,174,050 | Willett | Sept. 26, 1939 |
| 2,280,959 | Kronmiller | Apr. 28, 1942 |
| 2,493,190 | Fuchs | Jan. 3, 1950 |